United States Patent Office 3,414,382
Patented Dec. 3, 1968

3,414,382
METHOD AND APPARATUS FOR DETERMINING THE AMOUNT OF CARBON DEPOSITED ON CATALYST
Sixt Frederick Kapff and Lawrence T. Wright, Homewood, Ill., assignors to Standard Oil Company, Chicago, Ill., a corporation of Indiana
Filed Dec. 14, 1964, Ser. No. 418,182
8 Claims. (Cl. 23—230)

ABSTRACT OF THE DISCLOSURE

A method and apparatus for determining the amount of carbon deposited on catalyst utilizing a chamber having a sample inlet and outlet means, heater means, heater control means, gas flow regulator means, and recorder means adapted to receive an output signal for producing a record of the differential temperature versus time to measure the coke content of the sample in a method where the rate of progress of a combustion zone in a solid catalyst bed provides the measure of the carbon content on the catalyst sample.

---

This invention relates to determining the amount of carbon deposited on particulate solids. More particularly, this invention relates to method and means for determining the carbon level on catalyst by determining the rate of progression of a combustion zone through a heated bed of catalyst whereby the rate of progression provides a measure of the carbon level, or amount of carbon, on the catalyst sample.

In the operation of hydrocarbon processing units, carbon deposits, often called coke, accumulate on the catalyst particles. This carbon must be removed to maintain catalyst activity and efficiency. It is important for efficient operation of the processing unit that the regenerated catalyst from which carbon has been removed be returned to process with a low carbon content. This requires that the carbon removal operation be carefully controlled.

An example of such operation is catalytic cracking of gas oils in fluidized or moving bed type catalytic cracking units. In these units the catalyst is withdrawn from the reactor and regenerated by burning carbon deposits from the catalyst with air, and the regenerated catalyst returned to the cracking reactor. For most efficient operation of such cracking units, it is important that the regenerated catalyst being returned to the reactor have a controlled low carbon content which is not necessarily the lowest carbon content attainable.

In the normal operation of such catalytic cracking units, carbon levels on regenerated catalyst often build up much more than desirable due to upsets, changes in feed composition, or other causes. Regenerated catalyst carbon level can be determined by a laboratory analysis, but because of the time lag in such a system carbon levels may rise appreciably before operators are aware of the condition and can make the necessary adjustments.

The present invention provides method and apparatus readily adaptable for use in conjunction with a hydrocarbon processing unit to determine carbon level on catalyst rapidly and accurately. The invention provides a method for determining the carbon content of the sample of incombustible particulate solid which comprises heating a bed of the solid to a temperature above about 800° F. at which temperature combustion of the carbon can occur, passing oxidizing fluid, such as air, through the heated bed of solid at a preselected flow rate to produce a combustion zone in the bed, and determining the rate at which the combustion zone progresses through the bed, whereby the rate of progression of the combustion zone through the bed provides a measure of the carbon content of the sample. This method is particularly applicable to the determination of the coke content of a hydrocarbon conversion catalyst such as catalytic cracking catalyst.

This invention further provides apparatus for determining the amount of coke in a sample of particulate incombustible solid which apparatus comprises a chamber adapted to contain the sample, heater means for heating the chamber, regulating means for passing a constant flow rate of oxidizing fluid into the chamber, sensing means adapted to sense the rate of progression of a combustion zone through the sample and produce an output signal proportional thereto, which output signal provides a measure of the coke content of the sample. The chamber adapted to contain the sample is provided with inlet and outlet means, the inlet and outlet means preferably being provided with valves which conveniently are electrical solenoid valves or pneumatically operated valves which are adaptable to automatic control. The heater means for heating the chamber is conveniently an electrical resistance heater which is readily adaptable to automatic control and is also amenable to operation at the preferred temperature range of about 1000 to 1500° F. Suitable combination chamber and heater means is a metal tube for containing the sample, the tube being heated by passing through it an electrical current.

The heater control means for controlling the heat output of the heater can be a conventional temperature controller. A thermocouple can be used to sense the temperature of the heater for the purpose of temperature control, however, care should be taken to locate this thermocouple so that it is not overly sensitive to heat released upon combustion of the sample but is primarily responsive to the temperature of the heater itself.

It is preferred to use air as the oxidizing gas for burning the coke from the sample. A regulated constant flow of the air into the chamber is important so that combustion of coke in the sample proceeds at a constant burning rate. Thus, the combustion front or zone will proceed through the catalyst sample at a rate inversely proportional to the concentration of coke or carbon in the sample.

Thermocouples are conveniently used as the heat sensing means for detecting the presence of a combustion zone at a selected point in the sample. For convenience, two thermocouples can be connected differentially so that the temperature difference between them is indicated by the resulting output signal. Thus, as the combustion front approaches and passes the first thermocouple, the temperature difference will approach and pass through a maximum and then decrease to 0 when the combustion front is between the two thermocouples. As the combustion front continues to progress through the bed, it then approaches and passes the second thermocouple causing the differential temperature indication to pass through a maximum in the opposite direction, since the second thermocouple is now the hotter of the two, and then the differential temperature again approaches 0. The elapsed time between the two differential temperature maxima can be correlated with the percent carbon in the sample, since the air flow rate and the sample size remain constant. Any heat sensing means, such as series or individually connected thermocouples, may be used for detecting the passing of the combustion front through the sample. Electrical circuitry may be provided for starting a timer when the combustion front passes the first heat sensing means and for stopping the timer when the combustion front passes the second heat sensing means. This timer may conveniently be calibrated in terms of carbon content of the sample. The reading of the timer may be obtained visually or the timer may be adapted for analog output for use in computer process control. If desired, a strip-chart recorder may be connected to differential thermocouples in the catalyst sample to provide a continuous record of the progression of the combustion zone through the sample. The carbon content of the sample can be read directly or indirectly from this record.

Figure 1:
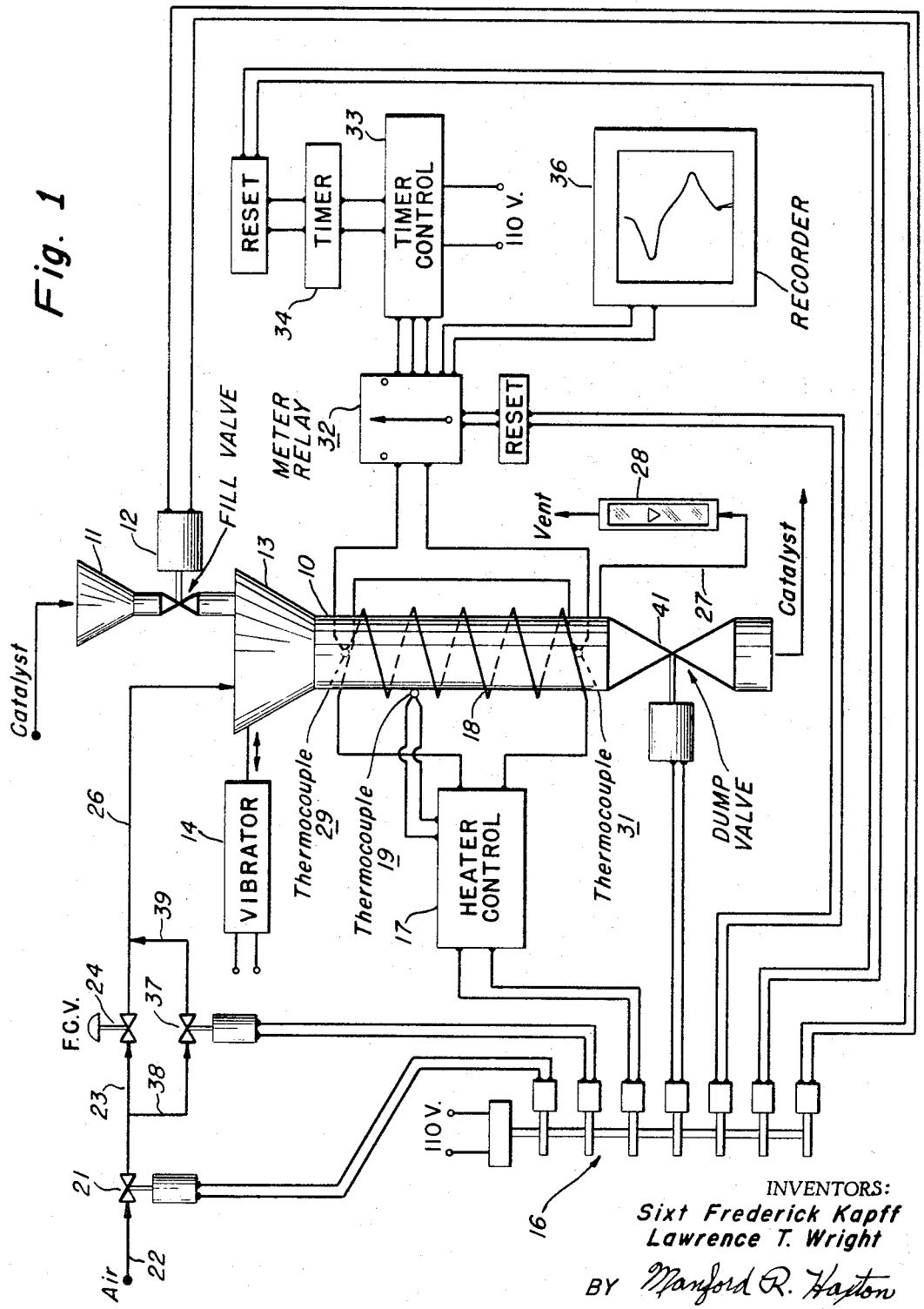
FIGURE 1 is a schematic diagram of a preferred embodiment of the invention.

Turning now to FIGURE 1, the method and apparatus of the invention will be described as applied to a preferred embodiment thereof. A sample of fluid catalytic cracking catalyst having coke deposited thereon is introduced into chamber 10 through hopper 11, solenoid operated fill valve 12 and funnel 13. An electrically operated vibrator 14 facilitates the flow of the catalyst sample into the chamber and serves to improve reproducibility of catalyst density in the chamber from sample to sample. The sample of catalyst to be tested is placed in hopper 11 and programmer 16 is then started. Operation of this embodiment of the invention is automatic from this point on. Programmer 16 closes the circuit to solenoid fill valve 12 permitting the sample to flow through funnel 13 into chamber 10, and then closes fill valve 12. The programmer 16 then closes the circuit to heater control 17 which heats chamber 10 by passing an electrical current through resistance wire winding 18. The heater control 17 regulates the current flowing through the winding 18 so that the temperature of the chamber as sensed by thermocouple 19 is maintained at a temperature of about 1500° F. The programmer 16 is set so that sufficient time is provided for heating of the catalyst sample to a constant high temperature, after which time the circuit to solenoid-operated air supply valve 21 is energized permitting combustion air to flow through line 22, valve 21, line 23, flow control valve 24 and line 26 into closed funnel 13, thence into the catalyst sample initiating a combustion zone in the top portion of the sample. Products of combustion are withdrawn from the bottom of chamber 10 through a fritted metal filter via line 27 and through flow meter 28 to vent. Thermocouple 29 located in the catalyst sample near the top of the catalyst bed in chamber 10 is connected differentially with thermocouple 31 which is also located in the catalyst bed but at a location near the bottom of the bed. The output signal from the differential thermocouple circuit is received by meter relay 32 which closes the circuit of timer control 33 when differential thermocouple output signal reaches a predetermined value. Timer control 33 in turn energizes the circuit to timer 34 to initiate operation of the timer when the combustion zone reaches thermocouple 29. As carbon is burned from the catalyst the combustion front, or zone, progresses down the catalyst bed at a rate which is inversely proportional to the amount of carbon contained in the sample. When the combustion front reaches thermocouple 31 causing the differential thermocouple otuput signal received by meter relay 32 to reach a predetermined value, the meter relay 32 energizes a shut-off signal to the timer control 33 which in turn stops the timer 34. Timer 34 then registers the elapsed time required for the combustion zone to progress through the catalyst bed from thermocouple 29 to thermocouple 31. The timer 34 may be calibrated in terms of elapsed time or, more conveniently, it may be calibrated in terms of coke content of the catalyst. A strip-chart recorder 36 is connected to the meter relay 32 to receive and record the output from differentially-connected thermocouples 29 and 31 to produce a record of the differential temperature, or temperature difference, versus time. The recorder is started and stopped at the times described for starting and stopping heater 18. In this embodiment, the programmer 16 is pre-set so that sufficient time is permitted for the combustion zone to pass through the sample when the sample contains the maximum anticipated amount of coke. Upon elapse of this pre-set time interval the programmer 16 turns off the heater control 17 which in turn opens the heater circuit stopping the current flow through winding 18. Simultaneously the programmer 16 energizes the circuit to solenoid-operated cooling air valve 37 which permits and increased flow of air, from air supply line 22 and valve 21 through lines 23, 38, 39 via line 26 through the funnel 13 and into the chamber 10, to cool the catalyst sample. The programmer 16 is pre-set to provide sufficient time for cooling of the catalyst. Upon elapse of this pre-set cooling time, the programmer 16 energizes solenoid-operated dump valve 41 which releases the spent catalyst sample from the chamber 10, and then closes the dump valve 41. The programmer 16 then closes cooling air valve 37, air supply valve 21, and energizes the reset circuits of the meter relay 32 and the timer 34 to place the meter relay 32 and timer 34 in their initial condition for the next analysis. The instrument is then in readiness to receive a new sample and make another analysis.

Figure 2:
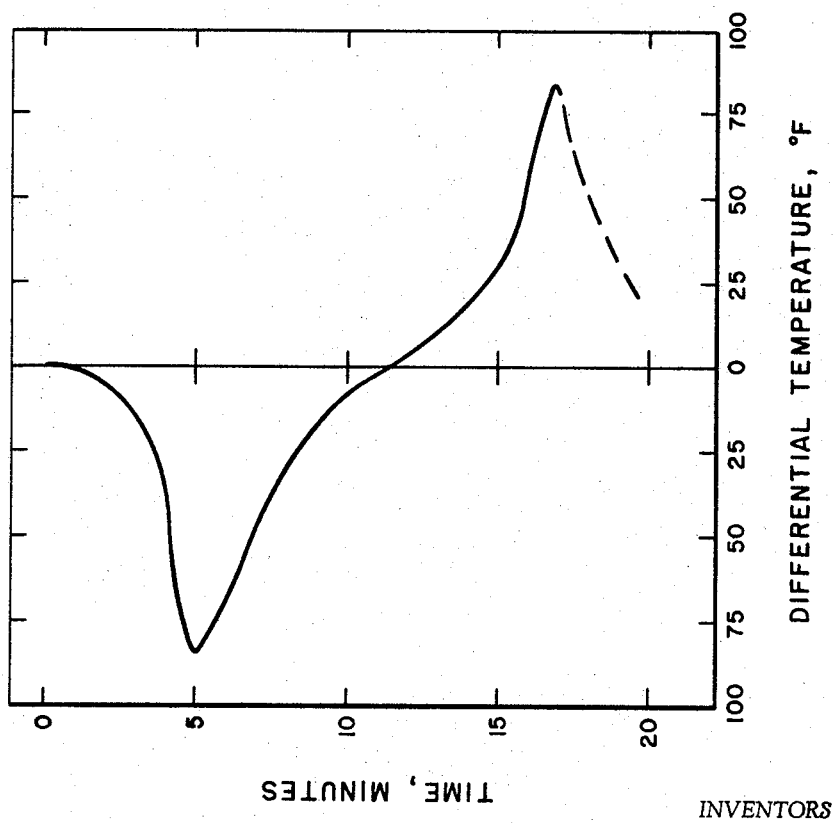
FIGURE 2 is a depiction of a strip-chart record produced by a recorder connected to differential thermocouples in a catalyst sample during determination of the carbon content according to the method and employing the apparatus of the invention.

FIGURE 2 illustrates a typical-chart record produced by recorder 36 during determination of the coke content of a fluid catalytic cracking catalyst sample.

Figure 3:
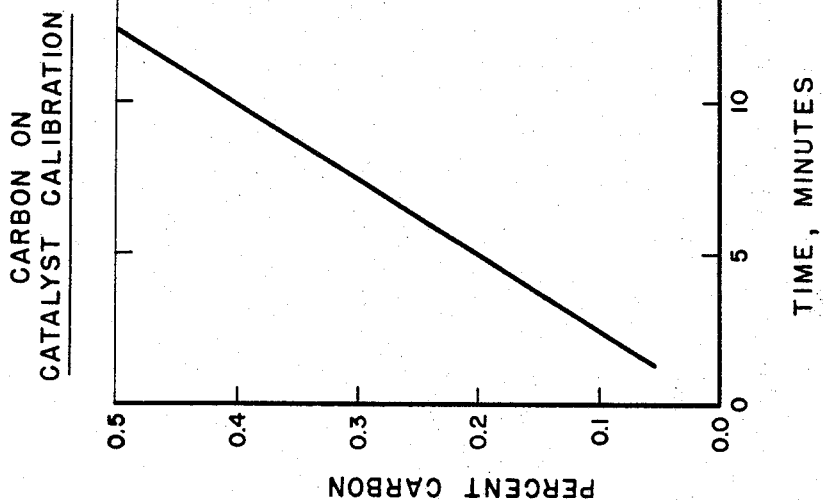
FIGURE 3 is a graph showing a calibration of an instrument constructed according to the invention for determining the amount of carbon deposited on a catalyst.

FIGURE 3 illustrates a calibration of percent carbon versus the time required for the combustion zone to pass between thermocouples 29 and 31 in a particular instrument, which calibration was used to calibrate timer 34 to indicate directly the carbon content of the catalyst sample.

In this preferred embodiment of the method and apparatus of this invention, air is used as the oxidizing gas at a constant flow rate of 60 cubic centimeters per minute. Chamber 10 is a metal tube having an inside diameter of ⅞" and a length sufficient to provide a distance between the differential thermocouples 29 and 31 of 2⅛". The furnace or winding temperature employed, as indicated by the heater control thermocouple 19, is 1300° F. Under these conditions, temperature deflections greater than 75° F. as illustrated in FIGURE 2, were obtained for higher carbon content samples.

While the invention has been described in connection with a particular embodiment of method and apparatus for carrying out the same, many variations will be obvious to those skilled in the art from the description thereof. Such variations are deemed to be within the scope of the invention. For example, oxygen concentrations in the oxidizing gas can be chosen for convenience in timing, with possible useful concentrations varying from very low to pure oxygen. For analysis of materials other than carbon or coke, oxidants other than oxygen may be employed. Also, thermocouples are only one means for determining passage of the combustion zone. Other means such as radiation detectors, resistance wires, thermistors, etc., can be used. The use of two thermocouples is not essential, a single one could be employed with the elapsed time beginning with the initiation of oxidizing gas flow and ending with the combustion front passing the single thermocouple.

Having thus described the invention what we claim is:

1. A method for determining the carbon content of a sample of incombustible particulate solid, which method comprises transferring a sample of coke-containing catalyst from a catalyst bed to a sample chamber, heating said sample to a temperature at which combustion of said carbon occurs, passing an oxidizing fluid through said heated sample of solid at a preselected flow rate to supply oxygen for combustion and to establish a combustion zone in said sample, and determining the rate at which said zone progresses through said sample, whereby the rate of progression of said zone through said sample provides a measure of the carbon content of said sample.

2. The method of claim 1 wherein said solid is a hydrocarbon conversion catalyst.

3. The method of claim 1 wherein said oxidizing fluid is air.

4. A method of determining the amount of coke deposited on a solid hydrocarbon conversion catalyst, which method comprises transferring a sample of coke-containing catalyst from a catalyst bed to a sample-chamber, heating said catalyst sample to a temperture sufficient to permit combustion of said coke, passing a constant flow of an oxygen-containing gas through said sample bed to produce a combustion zone in said sample, and determining the rate at which said zone progresses through said sample whereby the rate of progression of said zone through said sample provides a measure of the amount of coke originally on said catalyst.

5. Apparatus for determining the amount of coke in a sample of particulate incombustible solid which apparatus comprises a sample chamber for receiving a test sample from a system in which coke has been deposited on a catalyst, heater means for heating said chamber, regulating means for passing a constant flow rate of oxidizing fluid into said chamber, sensing means for sensing the rate of progression of a combustion zone through said sample and produce an output signal proportional thereto, which output signal provides a measure of the coke content of said sample.

6. Apparatus for determining the coke content of a sample of solid catalyst, which apparatus comprises a sample chamber for receiving a test sample from a system in which coke has been deposited on a catalyst, said chamber being provided with sample inlet and outlet means; heater means to heat said chamber; heater control means to maintain said chamber at a preselected temperature; gas flow regulating means to introduce a constant flow rate of oxidizing gas into said chamber, and outlet means for drawing gas from said chamber; heat sensing means to detect the presence of a combustion zone at a preselected point in said sample and produce a signal indicative thereof; second heat sensing means to detect the presence of a combustion zone in said sample at a second point which is a preselected distance from said first point and produce signal indicative thereof; indicator means for receiving said signals from said first and second heat sensing means and indicating the rate of progression of a combustion zone through said sample, whereby said rate of progression provides a measure of the coke content of said sample.

7. Apparatus for determining the coke content of a sample of solid catalyst, which apparatus comprises a sample chamber for receiving a test sample from a system in which coke has been deposited on a catalyst, said chamber being provided with valved sample inlet and oulet means; heater means to heat said chamber and said sample to a preselected temperature; gas inlet conduit means for introducing oxygen-containing gas into said chamber; outlet means for withdrawing gas from said chamber; gas flow regulating means for maintaining a constant gas flow rate of gas through said gas inlet conduit; first detector means for detecting the passing of a combustion zone past a first point in said sample and producing a signal indicative thereof; second detector means for detecting the passing of a combustion zone past a second point in said sample and producing a signal indicative thereof, which second point is downstream of said first point relative to the flow direction of said gas; timer means for receiving said signals from said first and second detector means and indicating the elapsed time between said first signal and said second signal which time provides a measure of the coke content of said sample.

8. Apparatus for determining the coke content of a sample of solid catalyst, which apparatus comprises a sample chamber for receiving a test sample from a system in which coke has been deposited on a catalyst, said chamber being provided with valved sample inlet and outlet means; heater means to heat said chamber and said sample to a preselected temperature; gas inlet conduit means for introducing oxygen-containing gas into said chamber; outlet means for withdrawing gas from said chamber; gas flow regulating means for maintaining a constant gas flow rate through said gas inlet conduit; differential thermocouple means to sense the difference in temperature between a first point in said sample and a second point in said sample spaced a fixed distance downstream of said first point relative to the flow direction of said gas and produce an output signal proportional thereto; recorder means to receive said output signal and produce a record of said differential temperature versus time, which record provides a measure of the coke content of said sample.

References Cited

UNITED STATES PATENTS 2,281,527    4/1942    Simpson et al. _____ 23—288 XR

MORRIS O. WOLK, *Primary Examiner.*

R. E. SERWIN, *Assistant Examiner.*